United States Patent
Brown et al.

(10) Patent No.: US 12,258,200 B2
(45) Date of Patent: Mar. 25, 2025

(54) SYSTEMS, KITS, AND METHODS FOR CONTACTLESS APPLICATION OF MIXED CONCENTRATES AND DILUENTS

(71) Applicant: Scatter, LLC, Hendersonville, TN (US)

(72) Inventors: Jason Lines Brown, Gallatin, TN (US); Christopher James Cunningham, Goodlettsville, TN (US); James Robert Seay, Hendersonville, TN (US); John-Mark Christian Bolton, Cary, NC (US); Karry Chase Harrison, Mount Holly, NC (US); Joshua William Whitelock, Morrisville, NC (US)

(73) Assignee: Scatter, LLC, Hendersonville, TN (US)

( * ) Notice: Subject to any disclaimer, the term of this patent is extended or adjusted under 35 U.S.C. 154(b) by 145 days.

(21) Appl. No.: 17/892,503

(22) Filed: Aug. 22, 2022

(65) Prior Publication Data

US 2023/0061566 A1     Mar. 2, 2023

Related U.S. Application Data

(60) Provisional application No. 63/274,816, filed on Nov. 2, 2021, provisional application No. 63/237,014, filed on Aug. 25, 2021.

(51) Int. Cl.
    *B65D 81/32*     (2006.01)
    *A01M 7/00*     (2006.01)
    (Continued)

(52) U.S. Cl.
    CPC ....... *B65D 81/3211* (2013.01); *A01M 7/0085* (2013.01); *B65D 25/38* (2013.01);
    (Continued)

(58) Field of Classification Search
    CPC .... B65D 81/3211; B65D 25/38; B65D 25/56; B05B 9/0403; B05B 9/0426; A01M 7/0085
    See application file for complete search history.

(56) References Cited

U.S. PATENT DOCUMENTS

| | | |
|---|---|---|
| 3,968,820 A | 7/1976 | Kolb et al. |
| 4,346,820 A | 8/1982 | Cavazza |
| | (Continued) | |

FOREIGN PATENT DOCUMENTS

| | | |
|---|---|---|
| CA | 3141515 | 12/2020 |
| WO | 2011130738 A1 | 10/2011 |

OTHER PUBLICATIONS

PCT Search Report and Written Opinion for PCT International Application No. PCTUS22/41096 dated Dec. 13, 2022.

(Continued)

*Primary Examiner* — Vishal Pancholi
(74) *Attorney, Agent, or Firm* — Olive Law Group, PLLC

(57) ABSTRACT

Systems, kits, and methods for contactless application of mixed concentrates and diluents are disclosed herein. According to an aspect, a system comprising a mix and storage container defining an interior and a first opening and a second opening. The first opening, the second opening and the interior are fluidly connected. Further, the system includes a connector that defines a first end, a second end, and a passageway that extends between the first end and the second end. The first end of the connector is attached to the first opening of the mix and storage container. The connector further defines an opener configured to engage and open a sealed portion of the concentrate container for release of a concentrate from within the concentrate container through (Continued)

the passageway and into the interior of the mix and storage container for mixing with a diluent. The system also includes an application tool.

24 Claims, 10 Drawing Sheets

(51) Int. Cl.
  *B65D 25/38* (2006.01)
  *B65D 25/56* (2006.01)
  *B05B 9/04* (2006.01)
(52) U.S. Cl.
  CPC ............ *B65D 25/56* (2013.01); *B05B 9/0403* (2013.01); *B05B 9/0426* (2013.01)

(56) References Cited

U.S. PATENT DOCUMENTS

| | | | |
|---|---|---|---|
| 4,607,671 A | 8/1986 | Aalto et al. | |
| 5,209,565 A * | 5/1993 | Goncalves | B65D 81/3211 141/366 |
| 5,304,163 A | 4/1994 | Bonnici et al. | |
| 5,350,372 A | 9/1994 | Ikeda et al. | |
| 5,454,409 A | 10/1995 | McAffer et al. | |
| 5,536,262 A | 7/1996 | Velasquez | |
| 6,223,945 B1 | 5/2001 | Giblin et al. | |
| 6,237,649 B1 | 5/2001 | Moisio et al. | |
| 6,558,365 B2 | 5/2003 | Zinger et al. | |
| 6,890,328 B2 | 5/2005 | Fowles et al. | |
| 7,074,216 B2 | 7/2006 | Fowles et al. | |
| 7,425,209 B2 | 9/2008 | Fowles et al. | |
| 8,226,627 B2 | 7/2012 | Fowles et al. | |
| 8,684,994 B2 | 4/2014 | Lev et al. | |
| 8,753,325 B2 | 6/2014 | Lev et al. | |
| 8,905,994 B1 | 12/2014 | Lev et al. | |
| 9,254,242 B2 | 2/2016 | Mueller et al. | |
| 9,688,434 B2 | 6/2017 | Stratis et al. | |
| 9,795,536 B2 | 10/2017 | Lev et al. | |
| 10,045,910 B2 | 8/2018 | Mueller et al. | |
| 10,646,404 B2 | 5/2020 | Denenburg et al. | |
| 10,669,063 B2 | 6/2020 | Stratis et al. | |
| 10,765,604 B2 | 9/2020 | Denenburg et al. | |
| 2002/0020637 A1 | 2/2002 | De Laforcade | |
| 2002/0066677 A1 | 6/2002 | Moscovitz | |
| 2005/0137566 A1 | 6/2005 | Fowles et al. | |
| 2007/0039975 A1 | 2/2007 | Bochtler | |
| 2009/0148490 A9 | 6/2009 | Harman et al. | |
| 2012/0078214 A1 | 3/2012 | Finke et al. | |
| 2012/0279990 A1 | 8/2012 | Werner et al. | |
| 2013/0305998 A1 | 11/2013 | Brown et al. | |
| 2018/0068396 A1 | 3/2018 | Lyons et al. | |
| 2020/0040188 A1 | 2/2020 | Park et al. | |
| 2020/0261317 A1 | 8/2020 | Denenburg et al. | |
| 2021/0069063 A1 | 3/2021 | Panick et al. | |

OTHER PUBLICATIONS

Andone Pharmaceuticals. "Vial-Bag Plus". 4 pages. (Date Unknown).
PCT Search Report and Written Opinion for PCT International Application No. PCTUS22/41089 dated Dec. 6, 2022.
Best Practices for Effective and Efficient Pesticide Application (Ozkan), Oct. 30, 2020, retrieved from URL: https://ohioline.osu.edu/factsheet/fabe-532.
Ex Parte Quayle Action for related U.S. Appl. No. 29/850,615.
Amazon webpage for product "DIY Pest Control Kit—Pro Grade Pesticide Bug Killer Spray ft. Our New Pop and Lock It SafetyChannelTM"; URL: https://www.amazon.com/Complete-DIY-Pest_Control-Kit/dp/B0BMHWZFB2, downloaded on Apr. 2, 2024.

\* cited by examiner

SYSTEMS, KITS, AND METHODS FOR CONTACTLESS APPLICATION OF MIXED CONCENTRATES AND DILUENTS

CROSS REFERENCE TO RELATED APPLICATIONS

This application claims priority to U.S. Provisional Patent Application No. 63/274,816, filed Nov. 2, 2021, and titled "A method for contactless mixing of a concentrate" and claims priority to U.S. Provisional Patent Application No. 63/237,014, filed Aug. 25, 2021, and titled "A method for contactless mixing of a concentrate"; the contents of which are incorporated herein by reference in their entireties.

This application is related to U.S. Nonprovisional patent application Ser. No. 17/892,594 (now U.S. Pat. No. 12,129,097), and titled CONNECTORS AND METHODS FOR CONTACTLESS TRANSFER OF FLUID BETWEEN CONTAINERS, and U.S. Design patent application Ser. No. 29/850,615 (now U.S. Design Pat. No. D1,041,621), and titled CONNECTOR FOR TRANSFER OF FLUID, both of which are filed simultaneously herewith.

TECHNICAL FIELD

The presently disclosed subject matter relates generally to pest control and lawncare. Particularly, the presently disclosed subject matter relates to systems, kits, and methods for contactless application of mixed concentrates and diluents.

BACKGROUND

Pest control is one of the most important considerations for an occupant of a residence. Example pests that often require attention of homeowners include roaches, ants, termites, and various flying pests. Pesticides, such as insecticides, are sprayed or otherwise applied to areas where pest control is intended. This can deter, incapacitate, kill, or otherwise discourage a pest from entering the area or nearby areas. Furthermore, pesticides are often applied around a perimeter of a residence to serve as a barrier to entry for pests. Such applications are generally effective for only a few months before another application is needed.

Pesticides are most commonly applied by a sprayer. Many retailers sell sprayers with a pre-mixed solution of pesticide therein. In this case, a homeowner can utilize the sprayer to apply the pesticide without needing to mix a concentrate or risk exposure thereto. In addition, this avoids improper mixing rates and increased risk of environmental hazards during the dilution process. However, pre-mixed pesticides can have a reduced efficacy if there is a long period from when the manufacturer prepared it and when the homeowner actually using it. Alternatively, concentrates and diluents can be manually mixed, but this requires exact mix ratios. Such problems also arise for chemical mixing in the area of lawncare.

In view of the foregoing difficulties of improper mixing and risk of exposure, there is a need for systems and techniques that facilitate easy mixing of concentrates and diluents while avoiding or at least mitigating risk of exposure.

BRIEF DESCRIPTION OF THE DRAWINGS

Figure 1:
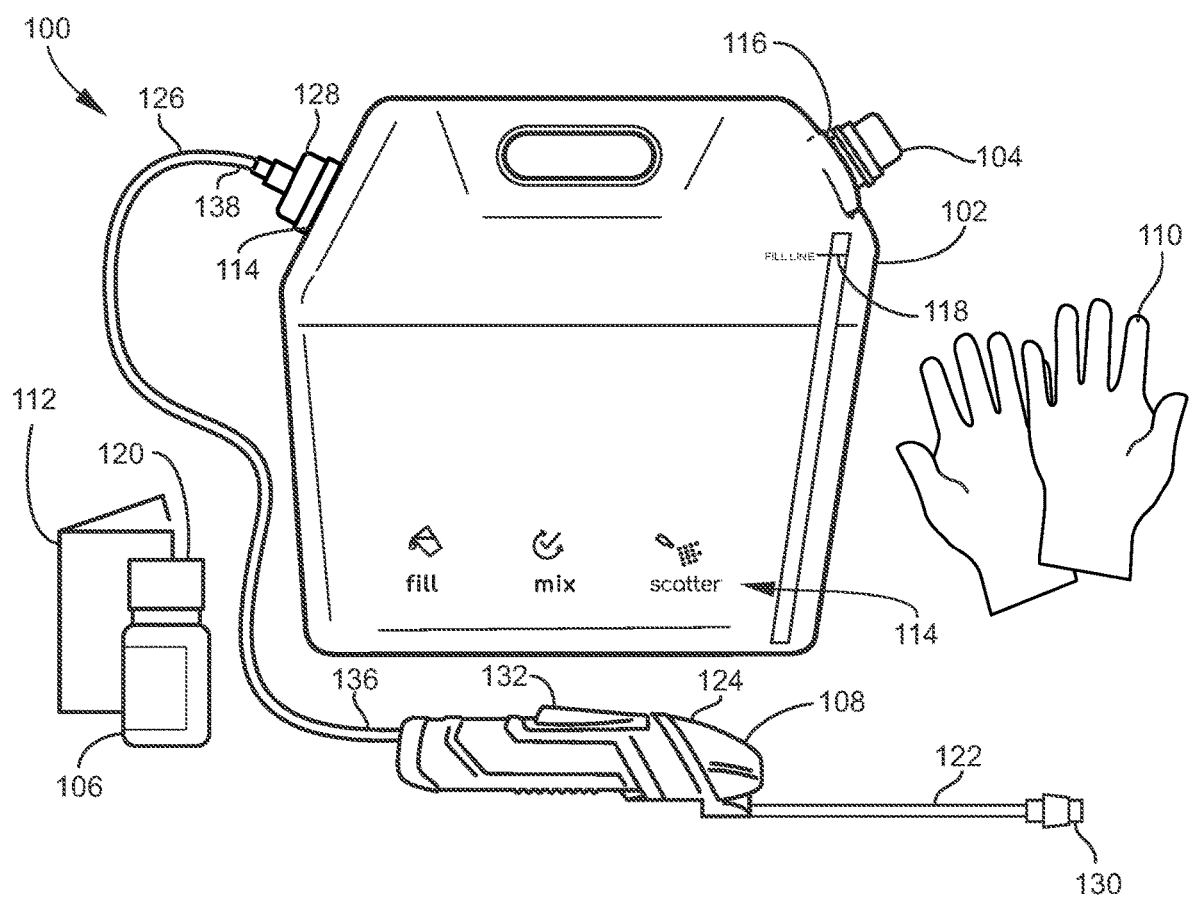
Figure 7:
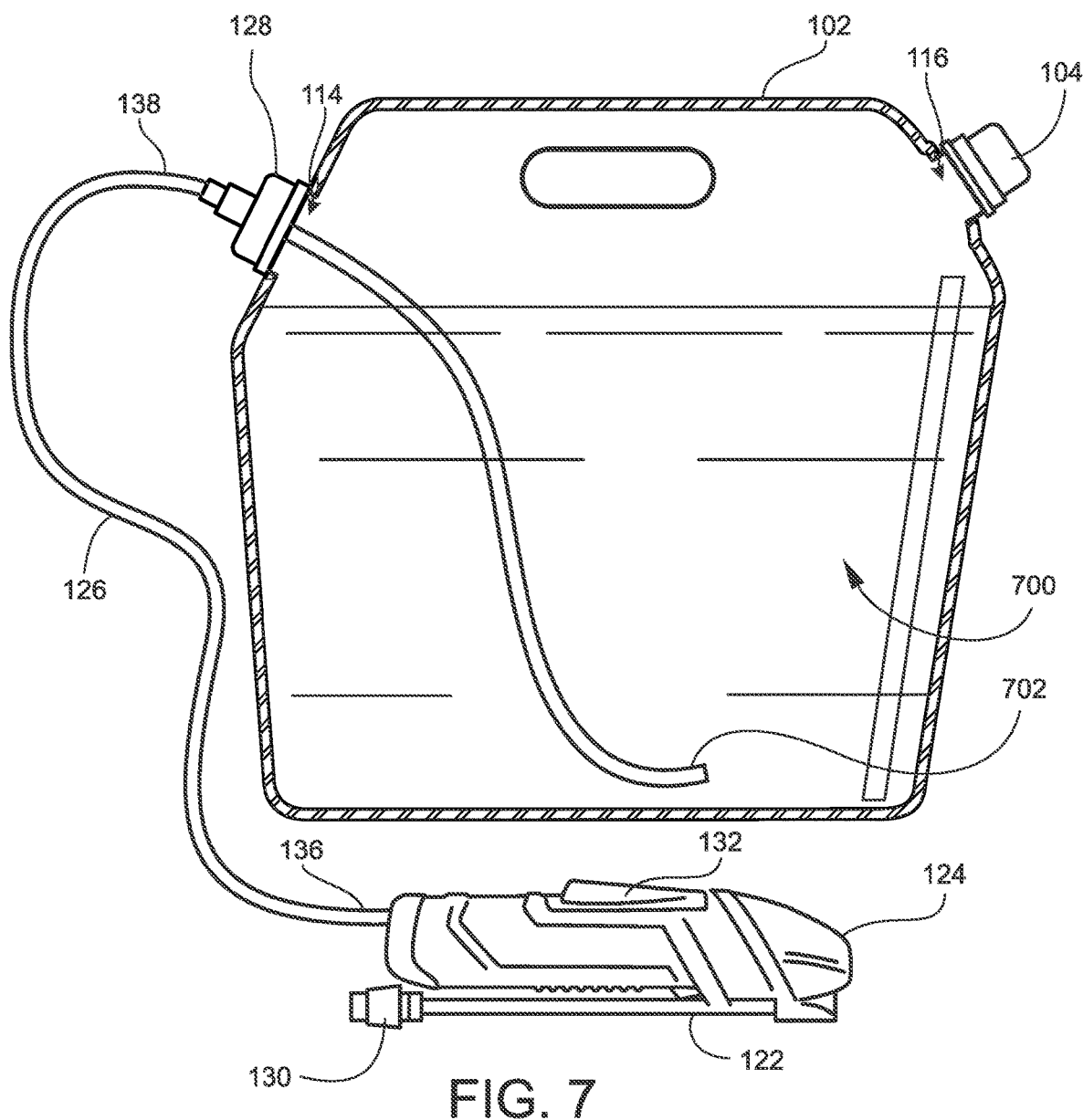
Figure 8:
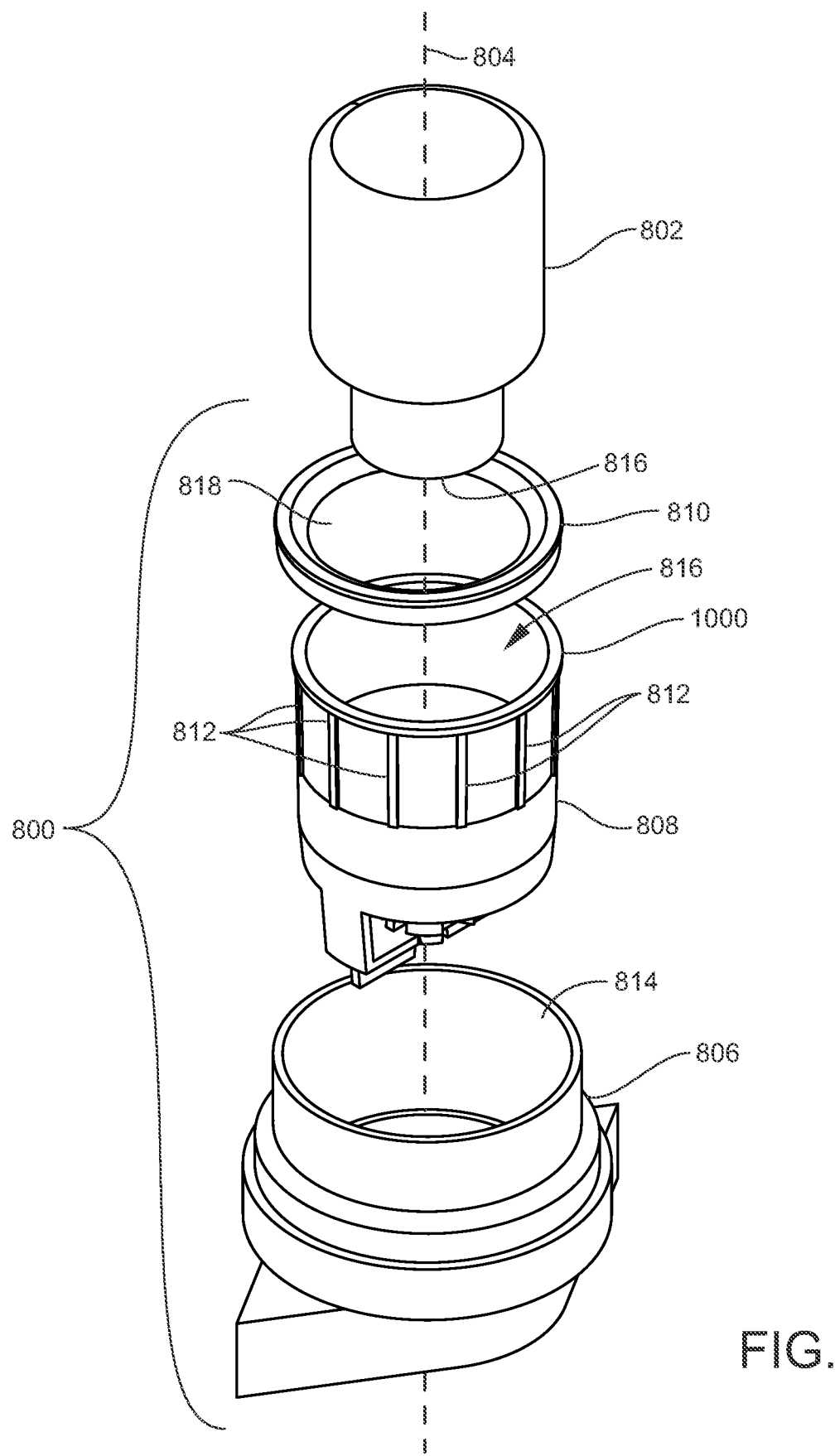
Figure 9:
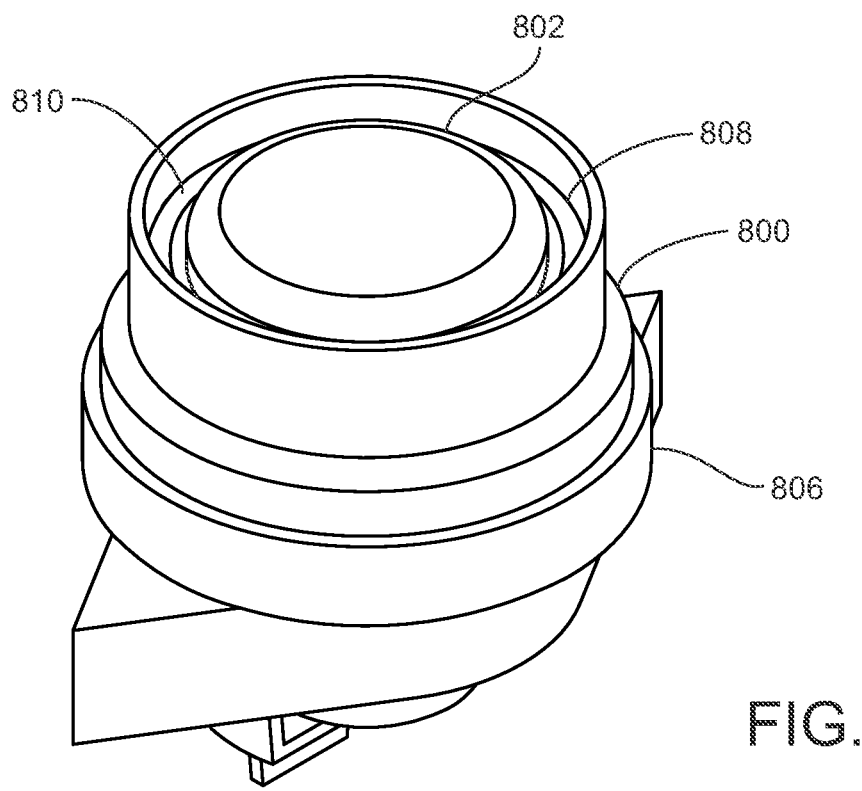
Figure 12:
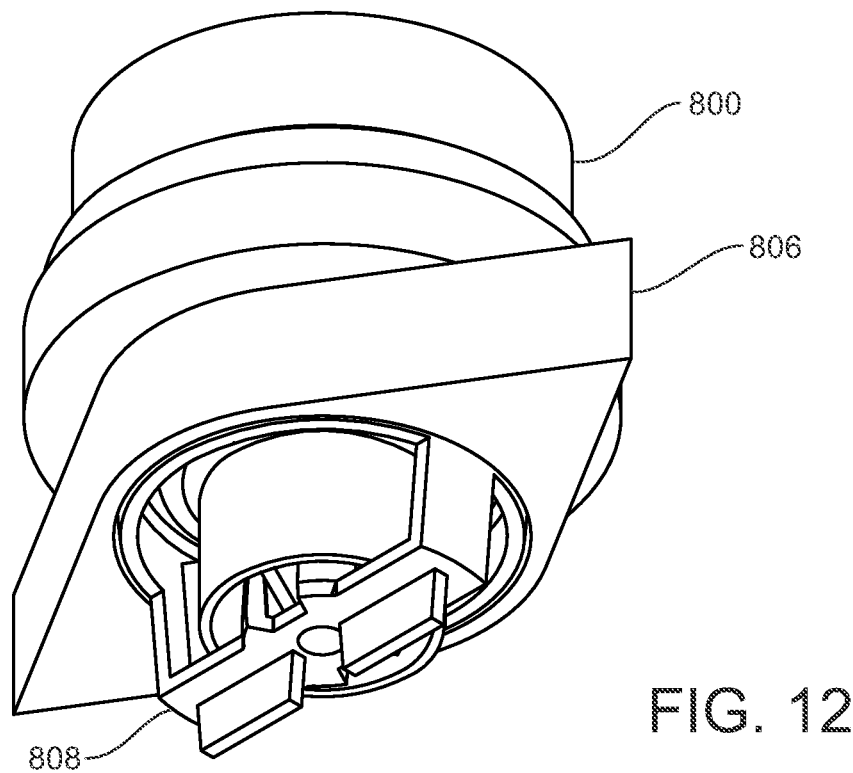
Figure 10:
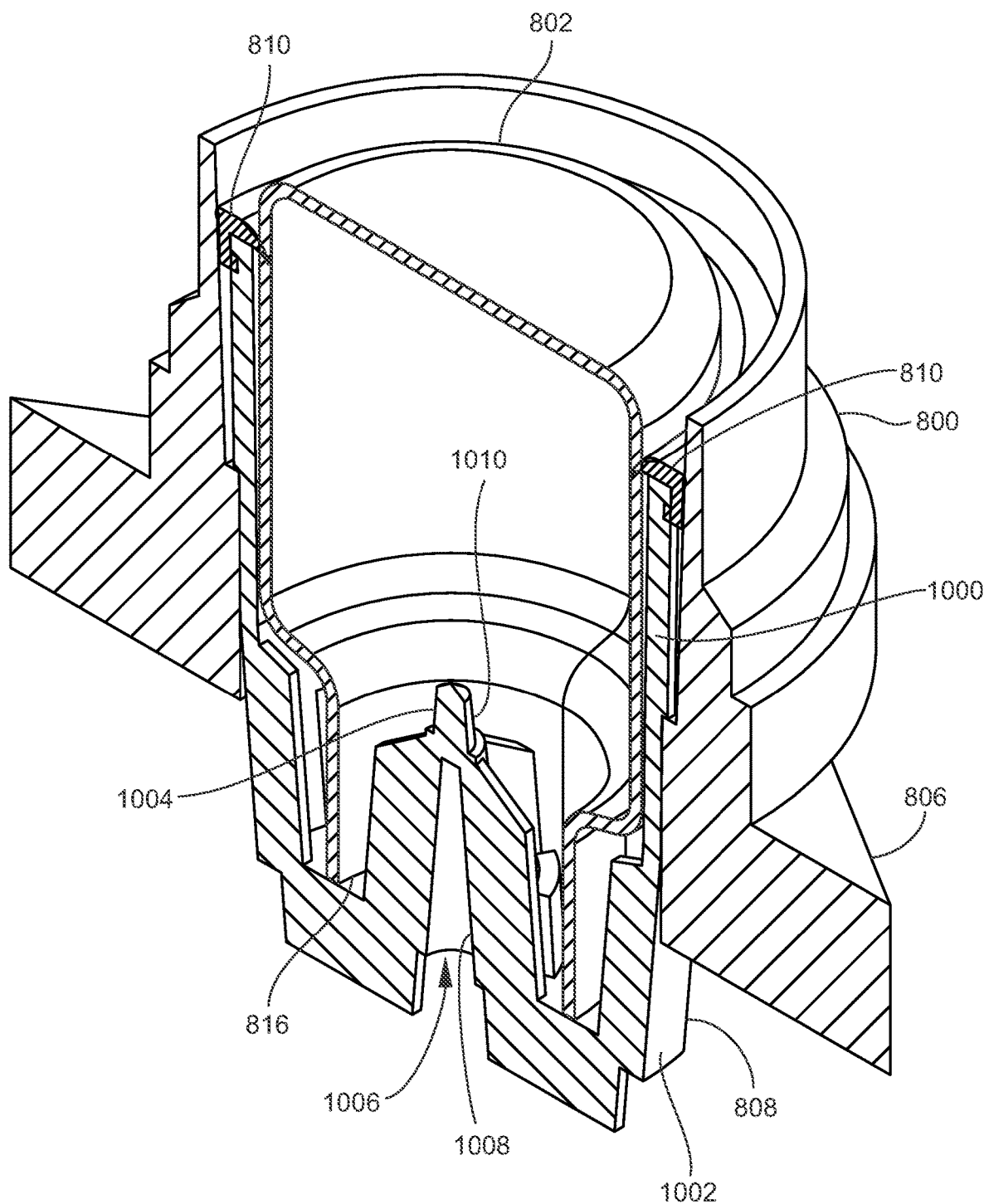
Figure 11:
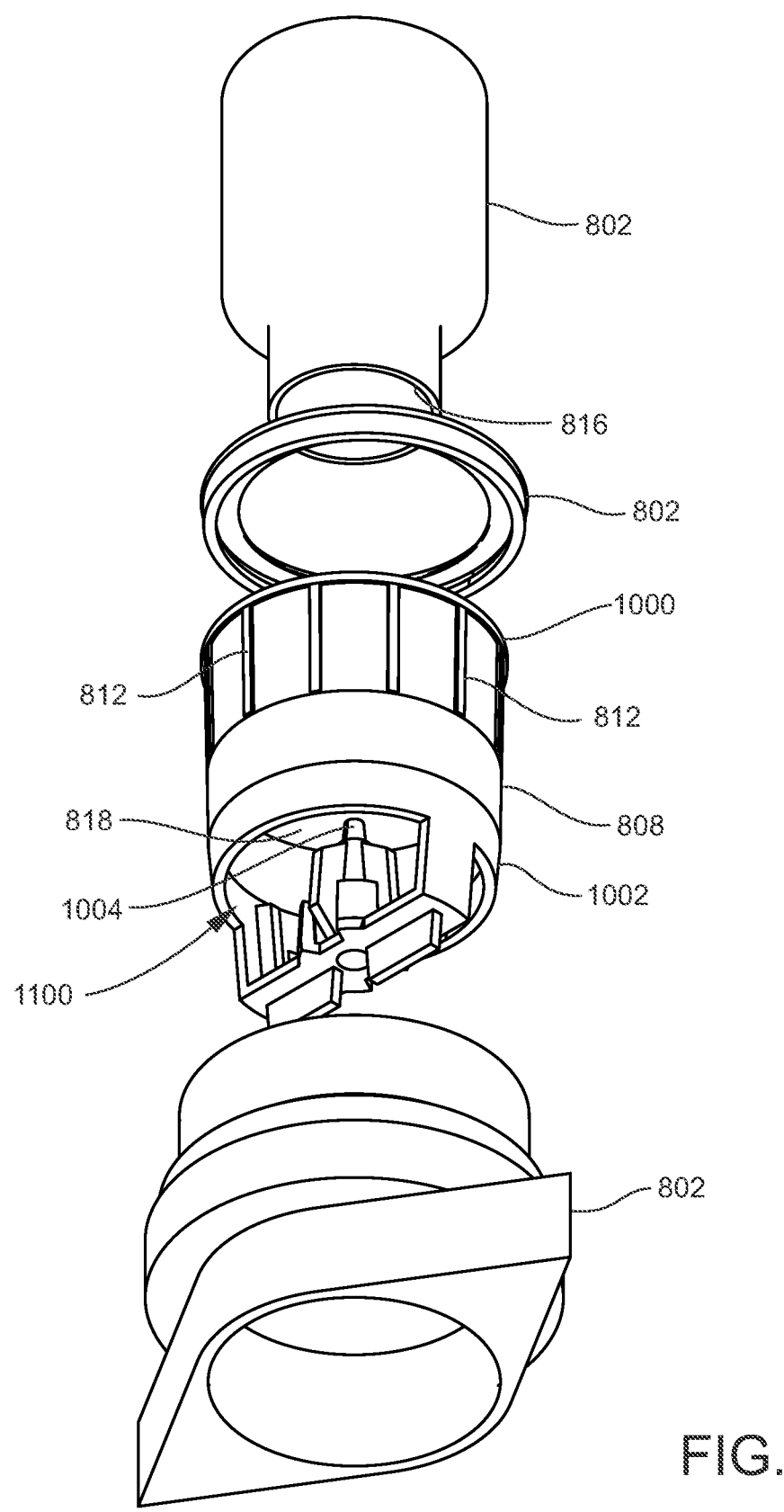

Having thus described the presently disclosed subject matter in general terms, reference will now be made to the accompanying Drawings, which are not necessarily drawn to scale, and wherein:

FIG. 1 is a view of a pest control kit including a mix and storage container, a connector/cap, a concentrate container, an application tool, a pair of gloves, and instructions in accordance with embodiments of the present disclosure;

FIGS. 2-6 are steps of an example method for preparing a mixture of concentrate and diluent for application in accordance with embodiments of the present disclosure;

FIG. 7 is a view of the system with the container in cross-section such that its interior can be seen;

FIG. 8 is an exploded top, perspective view of a connector with concentrate container in accordance with embodiments of the present disclosure;

FIG. 9 is a top perspective view of the components of the connector connected together with the concentrate container such that the contents of the concentrate container can be accessed and pass through a passageway of the connector to another container connected to the underside of the connector as described herein;

FIG. 10 is a perspective, cross-sectional view of the connector with the concentrate container attached thereto;

FIG. 11 is an exploded bottom, perspective view of the connector with the concentrate container; and FIG. 12 is a bottom perspective view of the components of the connector connected together with the concentrate container.

SUMMARY

The presently disclosed subject matter relates to systems, kits, and methods for contactless application of mixed concentrates and diluents. According to an aspect, a system comprising a mix and storage container defining an interior and a first opening and a second opening. The first opening, the second opening and the interior are fluidly connected. Further, the system includes a connector that defines a first end, a second end, and a passageway that extends between the first end and the second end. The first end of the connector is sealingly attached to the first opening of the mix and storage container. The second end of the connector is sealingly attachable to a concentrate container. The connector further defines an opener configured to engage and open a sealed portion of the concentrate container for release of a concentrate from within the concentrate container through the passageway and into the interior of the mix and storage container for mixing with a diluent. The system also includes an application tool attached to the second opening of the mix and storage container. The application tool is configured to receive the mixed concentrate and diluent from the interior and to apply the mixed concentrate and diluent to an area for pest control.

According to another aspect, a kit includes a mix and storage container defining an interior and a first opening and a second opening. The first opening, the second opening and the interior are fluidly connected. Further, the kit includes a connector that defines a first end, a second end, and a passageway that extends between the first end and the second end. The first end of the connector is sealingly attachable to the first opening of the mix and storage container. The second end of the connector is sealingly attachable to a concentrate container. The connector further defines an opener configured to engage and open a sealed portion of the concentrate container for release of a concentrate from within the concentrate container through the passageway and into the interior of the mix and storage container for mixing with a diluent. Further, the kit includes an application tool that is attachable to the second opening of the mix and storage container. The application tool is configured to receive the mixed concentrate and diluent from the interior and to apply the mixed concentrate and diluent to an area for pest control.

According to another aspect, a method includes providing a system comprising a mix and storage container defining an interior and a first opening and a second opening. The first opening, the second opening and the interior are fluidly connected. Further, the system includes a connector that defines a first end, a second end, and a passageway that extends between the first end and the second end. The first end of the connector is sealingly attached to the first opening of the mix and storage container. Further, the connector further defines an opener. The method also includes attaching the second end of the connector to a concentrate container. Further, the method includes using the opener to engage and open a sealed portion of the concentrate container for release of a concentrate from within the concentrate container through the passageway and into the interior of the mix and storage container for mixing with a diluent. The method also includes using an application tool attached to the second opening of the mix and storage container for applying the mixed concentrate and diluent to an area for pest control.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

In accordance with embodiments, pest control systems, kits, and methods for contactless application of mixed concentrates and diluents are disclosed. These systems, kits, and methods can reduce or eliminate the likelihood of inaccurate mixing and mishandling of pesticides or other chemicals, such as chemicals for lawncare. A system can include a mix and storage container, a container, and an application tool. The mix and storage container can be used for mixing a concentrate and diluent. Also, the mix and storage container can be used for storing and carrying the mixed concentrate and diluent during application. The connector can connect a concentrate container with the mix and storage container so that concentrate in the concentrate container can be transferred to the mix and storage container. Further, the connector can have an opener that opens a sealed portion of the concentrate container for release of the concentrate in order to facilitate contactless handling of the concentrate. The application tool can be attached to the mix and storage container and used to apply the mixed concentrate and diluent to an area for pest control.

FIG. 1 illustrates a view of a pest control kit 100 including a mix and storage container 102, a connector/cap 104, a concentrate container 106, an application tool 108, a pair of gloves 110, and instructions 112 in accordance with embodiments of the present disclosure. The kit 100 may be suitably boxed or packaged, and provided to an operator for assembly and application of a pesticide or other solution to a treatment area. As described in more detail herein, the kit 100 can be assembled to provide a system that that facilitates easy mixing of concentrates and diluents while avoiding risk of exposure to the concentrates. The instructions 112 and writings and/or images 114 can provide directions for the user to assemble the system.

In this example, the mix and storage container 102 is a flexible bladder that defines an interior for receiving and holding a concentrate and diluent for mixing prior to application. Alternatively, for example, the container 102 may be a rigid structure. The mix and storage container 102 includes openings 114 and 116 at its upper portion. The openings 114 and 116 are fluidly connected to an interior (not shown) of the container 102. For example, the openings 114 and 116 can be positioned above a fill line 118 such that the contents of the container 102 do not spill or inadvertently leak so long as the container 102 is oriented in an upright position and too much concentrate and diluent are not added to the container 102. The fill line 118 indicates a level to reach by adding diluent (e.g., water) after the concentrate has been added as described herein.

With continuing reference to FIG. 1, the gloves 110 can be worn during assembly of the system, mixing, and application of the pesticide by the user in order to reduce of direct contact by the user's skin with the pesticide. The concentrate can be provided in the container 106. The container 106 can include a cap 120 and sealed portion (not shown) for containing the concentrate.

The application tool 108 includes a wand 122, a pump 124, a flexible tube 126, and a connector 128. The wand 122 can be a foldable for compact packaging or storage. Further, the wand 122 can have a nozzle 130 for emitting and spraying the pesticide. The pump 124 can be an electric pump having a button 132 to control the pump 124 to draw pesticide from the interior of the container 102 through the tube 126 and out the nozzle 130 of the wand 122. The tube 126 can be connected to the pump 124 at one end 134 and to the connector 128 at an opposing end 136.

FIGS. 2-6 illustrates steps of an example method for preparing a mixture of concentrate and diluent for application in accordance with embodiments of the present disclosure. In this example, the kit 100 shown in FIG. 1 is used for preparing the mixture, although it should be understood that any suitable kit or system may be used.

Figure 2:
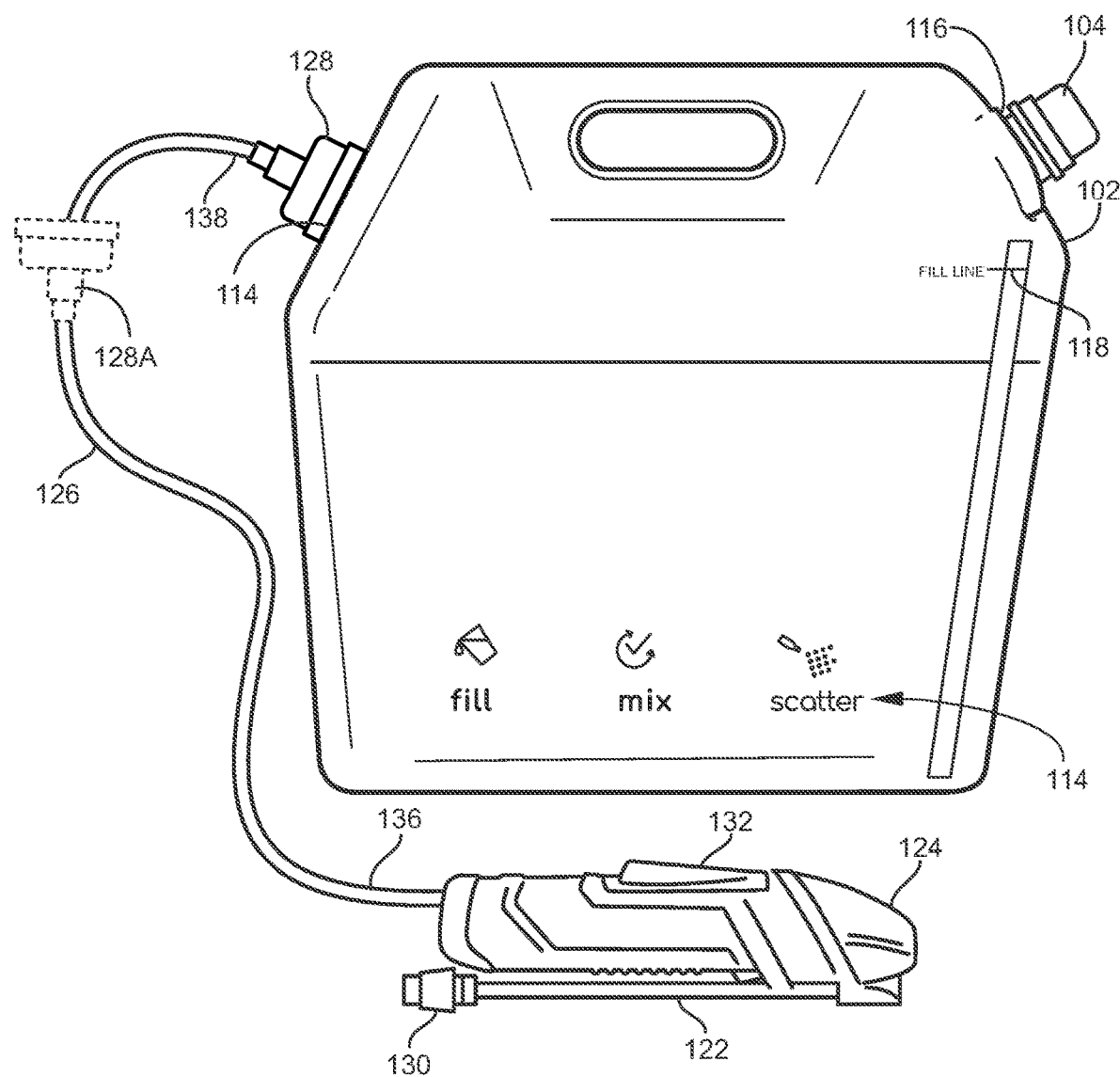

Referring to FIG. 2, as an initial step the application tool 108 can be operably attached to the mix and storage container 102. Particularly, the connector 128A (indicated by broken line) can initially be in one position separated from the opening 114. Subsequently, the connector 128 can be suitably attached to the opening 114. The connector 128 can be sealingly attached to the opening 114 such as by screwing or a snap-connection as will be understood by those of skill in the art. It is noted that in this example, the application tool 108 is shown in a folded configuration in which the wand 122 is folded back against the pump 124.

Figure 3:
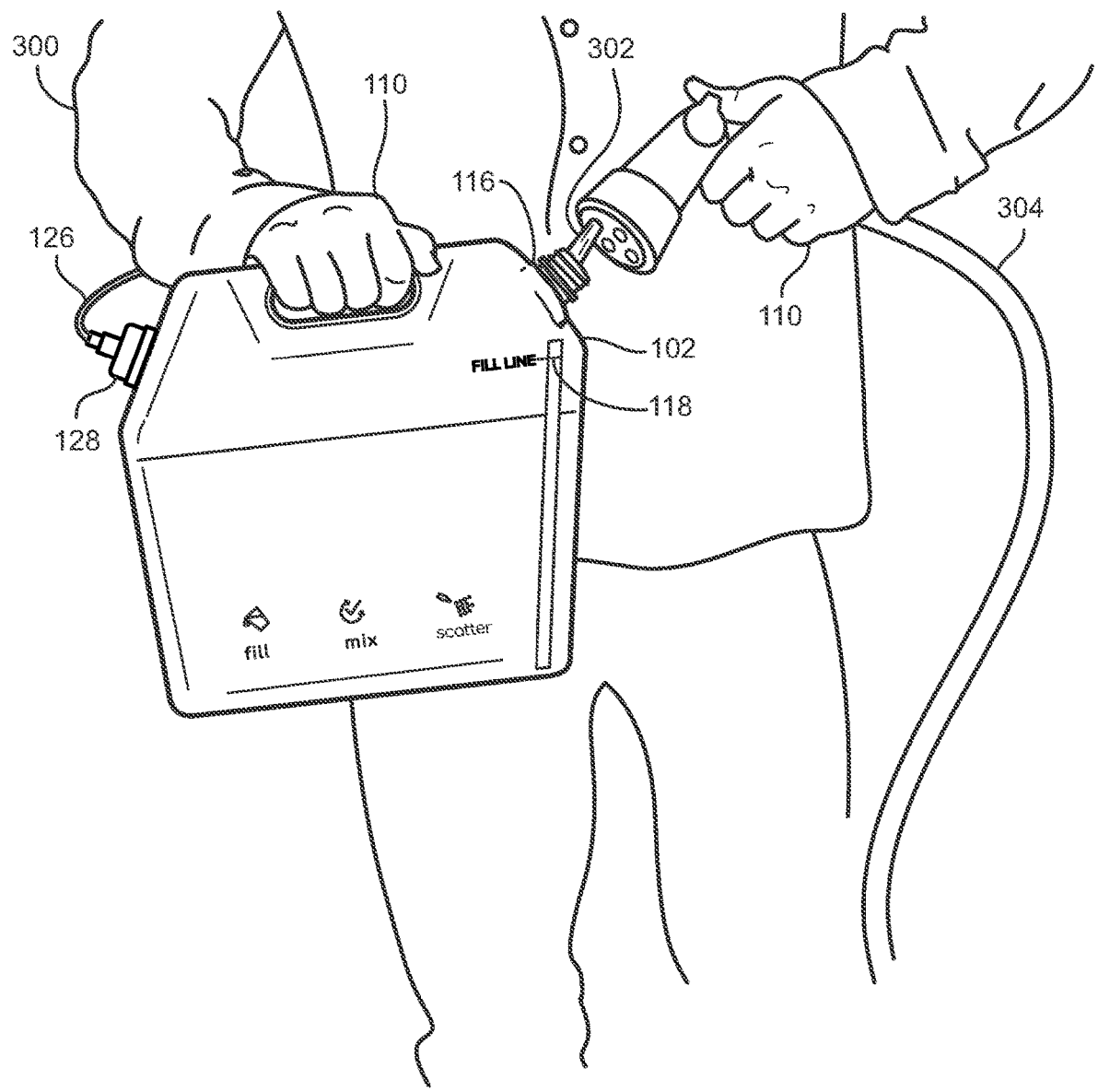

FIG. 3 shows an example step of an operator 300 adding diluent 302 into the container 102. In this example, the diluent 302 is water, and the operator 300 adds the water by use of a garden hose 304.

Figure 4:
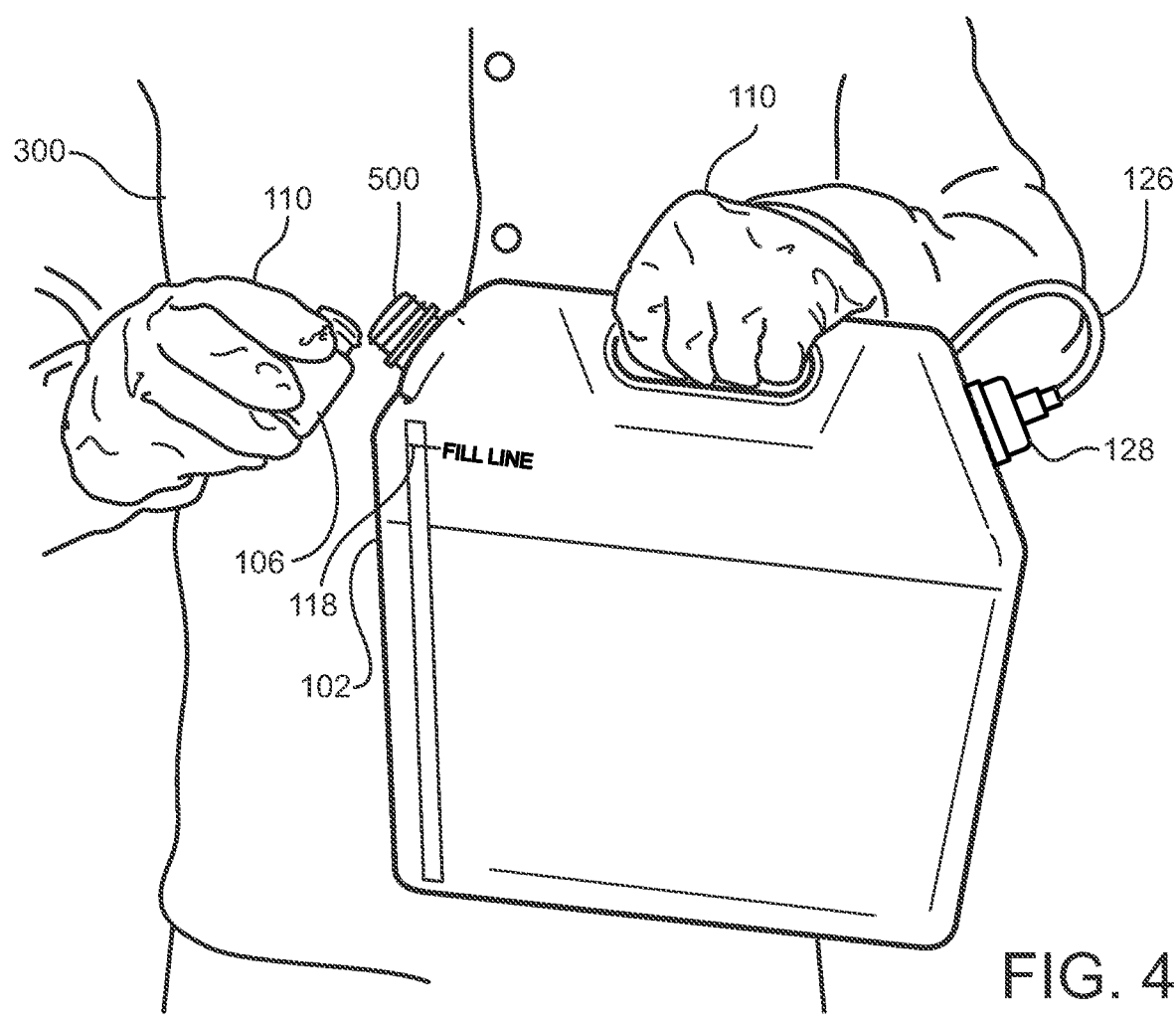
Figure 5:
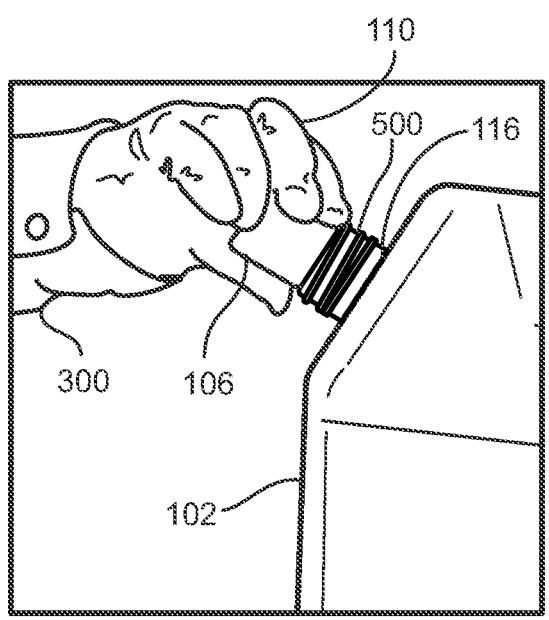

At a subsequent step as shown in FIG. 4, an operator 300 can remove the connector/cap to provide an opening 500 for the concentrate (not shown) within the container 106 can be added into the interior of the container 102. FIG. 5 shows an example step of the operator 300 pouring the concentrate into the container 102.

Figure 6:
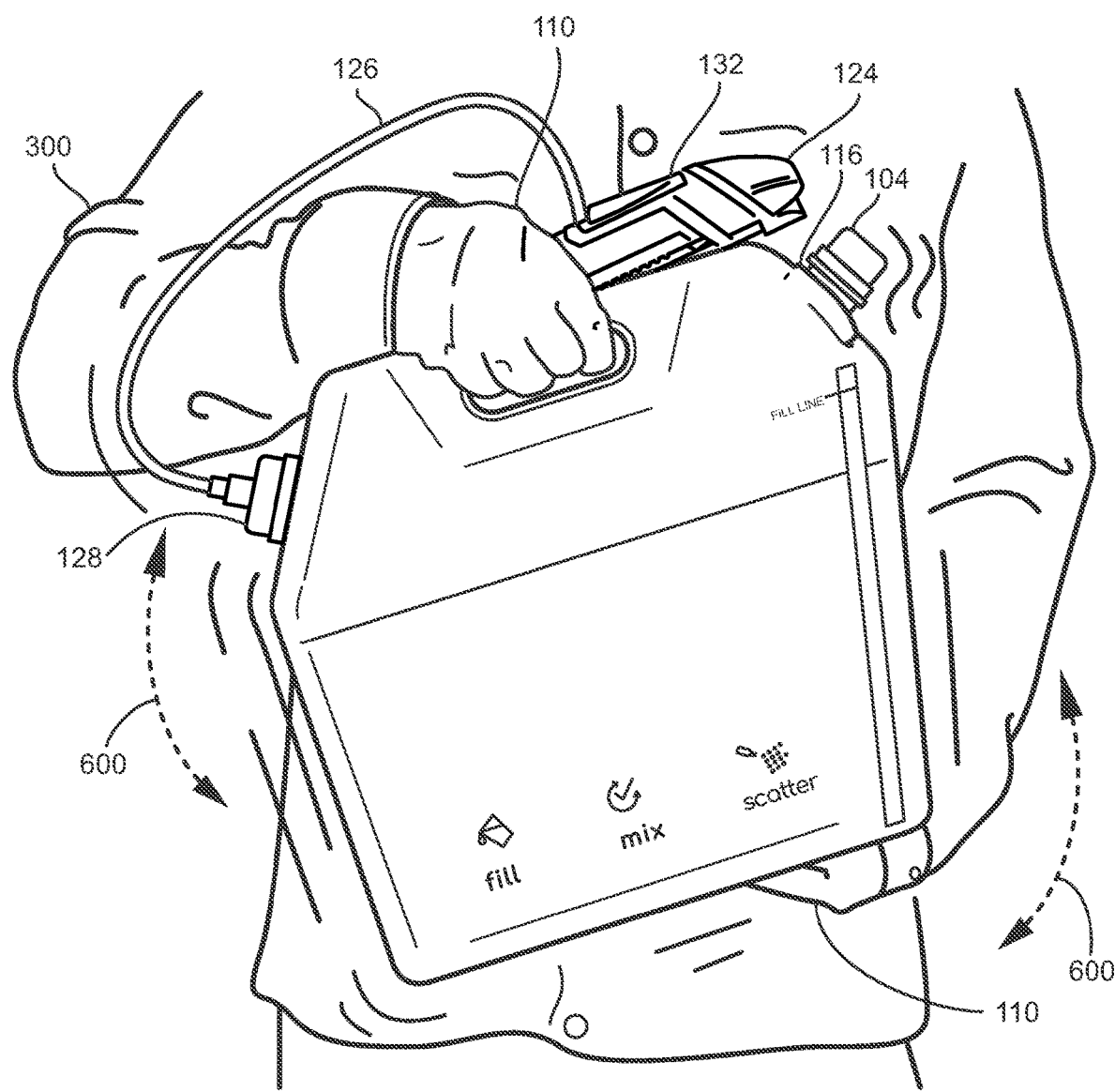

Subsequently, at the step shown in FIG. 6, the operator 300 can put the connector/cap 104 back on to seal the opening. Also, as shown in FIG. 6, the operator 300 can shake the container 102 in order to mix the concentrate and diluent such that the mixture is ready for application. The container 102 may be shook in the directions generally indicated by double arrows 600 or in any other suitable direction.

FIG. 7 illustrates a view of the system with the container 102 in cross-section such that its interior 700 can be seen. Referring to FIG. 7, the interior has a lower portion where an end 702 of the tube 126 may be positioned. Also, it can be seen that openings 114 and 116 and the interior 700 are fluidly connected. The diluent and concentrate may be mixed in the interior 700.

FIG. 8 illustrates an exploded top, perspective view of a connector (generally designated 800) with concentrate container 802 in accordance with embodiments of the present disclosure. The components of the connector 800 and the concentrate container 802 are aligned along an axis 804. FIG. 9 illustrates a top perspective view of the components of the connector 800 connected together with the concentrate container 802 such that the contents of the concentrate container 802 can be accessed and pass through a passageway of the connector 800 to another container (not shown) connected to the underside of the connector 800 as described herein.

Turning particularly to FIG. 8, the connector 800 includes two bodies 806 and 808 and a gasket 810. The body 808 can be nested inside the body 806. Also, the body 808 defines multiple ridges 812 that fit to an interior surface 814 of the body 806 for securely attaching the bodies 806 and 808 together. As will be shown and described in further detail, the gasket 810 can fit inside the body 808 and be used to sealingly attach the concentrate container 802 to the body 808. As a result of the sealed attachment, the contents of the concentrate container 802 can be released through its opening 816 and into the passageway defined by the body 808 in its interior without exiting between the interface of the concentrate container 802 and the body 808.

FIG. 10 illustrates a perspective, cross-sectional view of the connector 800 with the concentrate container 802 attached thereto. Referring to FIG. 10, the body 808 defines an upper end 1000 and a lower end 1002. The upper end 1000 sealingly attaches to the concentrate container 802 as shown with the aid of the gasket 810. The lower end 1002 (i.e., any portion of the body 808 lower than the upper end 1000) can engage another container (i.e., a mix and storage container) either directly or via another body such as body 808. Also, it is noted that the body 806 may be a part of another container such as a mix and storage container as described herein.

With continuing reference to FIG. 10, the connector 800 includes an opener 1004 configured to engage and open the concentrate container 802 for release of a contents (e.g., a fluid) from within the concentrate container 802 through a passageway (generally designated 1006) and into a container attached to the lower end 1002 when the concentrate container 802 and the container attached to the lower end 1002. The opener 1004 defines an interior 1008 for forming part of the passageway 1006. An upper portion 1010 of the opener 1004 defines a tapered shape for piercing a sealed portion of the concentrate container 802.

FIG. 11 illustrates an exploded bottom, perspective view of the connector 800 with the concentrate container 802. Referring to FIG. 11, it can be seen that the lower end 1002 of the body 808 defines an opening 1100. Also, it can be seen in FIG. 8 that the upper end 1000 of the body 808 defines another opening 816. Further, the body 808 defines an interior 818 between the openings 816 and 1100 that is substantially cylindrical in shape for fitting to the concentrate container 802. Alternatively, the interior 818 may be any other suitable shape and size for fitting to a differently shaped and sized container. For further illustration, FIG. 12 illustrates a bottom perspective view of the components of the connector 800 connected together with the concentrate container 802.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
    a mix and storage container defining a first interior and a first opening and a second opening, wherein the first opening, the second opening and the first interior are fluidly connected;
    a connector that includes a body that defines a first end, a second end, and a passageway that extends between the first end and the second end, wherein the first end of the connector is sealingly attached to the first opening of the mix and storage container, and the second end of the connector is sealingly attachable to a concentrate container, wherein the connector further defines an opener configured to engage and open a sealed portion of the concentrate container for release of a concentrate from within the concentrate container through the passageway and into the first interior of the mix and storage container for mixing with a diluent, wherein the body defines a second interior sized and dimensioned to nest the concentrate container; and
    an application tool attached to the second opening of the mix and storage container, and wherein the application tool is configured to receive the mixed concentrate and diluent from the first interior and to apply the mixed concentrate and diluent to an area for pest control.

2. The system of claim 1, wherein the mix and storage container is made of a flexible material.

3. The system of claim 1, wherein the mix and storage container comprises a handle.

4. The system of claim 1, wherein the concentrate container defines a third opening and comprises a seal that is attached to the third opening.

5. The system of claim 1, wherein the application tool is detachable from the second opening of the mix and storage container.

6. The system of claim 1, wherein the system further comprises a pair of gloves.

7. A kit comprising:
a mix and storage container defining a first interior and a first opening and a second opening, wherein the first opening, the second opening and the first interior are fluidly connected;
a connector that includes a body that defines a first end, a second end, and a passageway that extends between the first end and the second end, wherein the first end of the connector is sealingly attachable to the first opening of the mix and storage container, and the second end of the connector is sealingly attachable to a concentrate container, wherein the connector further defines an opener configured to engage and open a sealed portion of the concentrate container for release of a concentrate from within the concentrate container through the passageway and into the first interior of the mix and storage container for mixing with a diluent, wherein the body defines a second interior sized and dimensioned to nest the concentrate container; and
an application tool that is attachable to the second opening of the mix and storage container, and wherein the application tool is configured to receive the mixed concentrate and diluent from the first interior and to apply the mixed concentrate and diluent to an area for pest control.

8. The kit of claim 7, wherein the mix and storage container is made of a flexible material.

9. The kit of claim 7, wherein the mix and storage container comprises a handle.

10. The kit of claim 7, wherein the concentrate container defines a third opening and comprises a seal that is attached to the third opening.

11. The kit of claim 7, wherein the application tool is detachable from the second opening of the mix and storage container.

12. The kit of claim 7, wherein the system further comprises a pair of gloves.

13. A method comprising:
providing a system comprising:
a mix and storage container defining a first interior and a first opening and a second opening, wherein the first opening, the second opening and the first interior are fluidly connected;
a connector that includes a body that defines a first end, a second end, and a passageway that extends between the first end and the second end, wherein the first end of the connector is sealingly attached to the first opening of the mix and storage container, wherein the connector further defines an opener, wherein the body defines a second interior sized and dimensioned to nest a concentrate container;
attaching the second end of the connector to the concentrate container;
using the opener to engage and open a sealed portion of the concentrate container for release of a concentrate from within the concentrate container through the passageway and into the first interior of the mix and storage container for mixing with a diluent; and
using an application tool attached to the second opening of the mix and storage container for applying the mixed concentrate and diluent to an area for pest control.

14. The method of claim 13, further comprising:
engaging the concentrate container to release the concentrate into the first interior of the mix and storage container; and
moving the mix and storage container to agitate and mix the concentrate and diluent contained therein.

15. The method of claim 13, wherein the mix and storage container is made of a flexible material.

16. The method of claim 13, wherein the mix and storage container comprises a handle.

17. The method of claim 13, wherein the concentrate container defines a third opening and comprises a seal that is attached to the third opening.

18. The method of claim 13, wherein the application tool is detachable from the second opening of the mix and storage container.

19. The method of claim 13, wherein the system further comprises a pair of gloves.

20. A system comprising:
a mix and storage container defining an interior and a first opening and a second opening, wherein the first opening, the second opening and the interior are fluidly connected;
a connector that defines a first end, a second end, and a passageway that extends between the first end and the second end, wherein the first end of the connector is sealingly attached to the first opening of the mix and storage container, and the second end of the connector is sealingly attachable to a concentrate container, wherein the container defines a body and a sealed portion, wherein the connector further defines an opener configured to engage and open the sealed portion of the concentrate container for release of a concentrate from within the concentrate container through the passageway and into the interior of the mix and storage container for mixing with a diluent, wherein the connector defines at least one surface adjacent to the opener, wherein the connector defines a gasket that encloses the body of the concentrate container when the concentrate is released for sealingly holding the released concentrate between the body of the concentrate container and the at least one surface of the connector; and
an application tool attached to the second opening of the mix and storage container, and wherein the application tool is configured to receive the mixed concentrate and diluent from the interior and to apply the mixed concentrate and diluent to an area for pest control.

21. The system of claim 1, wherein the body of the connector defines a third opening for receiving the concentrate container, and
wherein the system further comprises a cap that is sealingly attachable to the third opening for sealingly enclosing the concentrate container within the second interior.

22. The kit of claim 7, wherein the body of the connector defines a third opening for receiving the concentrate container, and
wherein the kit further comprises a cap that is sealingly attachable to the third opening for sealingly enclosing the concentrate container within the second interior.

23. The method of claim 13, wherein the body of the connector defines a third opening for receiving the concentrate container, and
    wherein the method further comprises a cap that is sealingly attachable to the third opening for sealingly enclosing the concentrate container within the second interior.

24. The system of claim 20, wherein the body of the connector defines a third opening for receiving the concentrate container, and
    wherein the system further comprises a cap that is sealingly attachable to the third opening for sealingly enclosing the concentrate container within the second interior.

\* \* \* \* \*